Nov. 3, 1925.  1,560,506
L. H. DYER
INTERNAL COMBUSTION ENGINE
Filed May 29, 1923   3 Sheets-Sheet 2
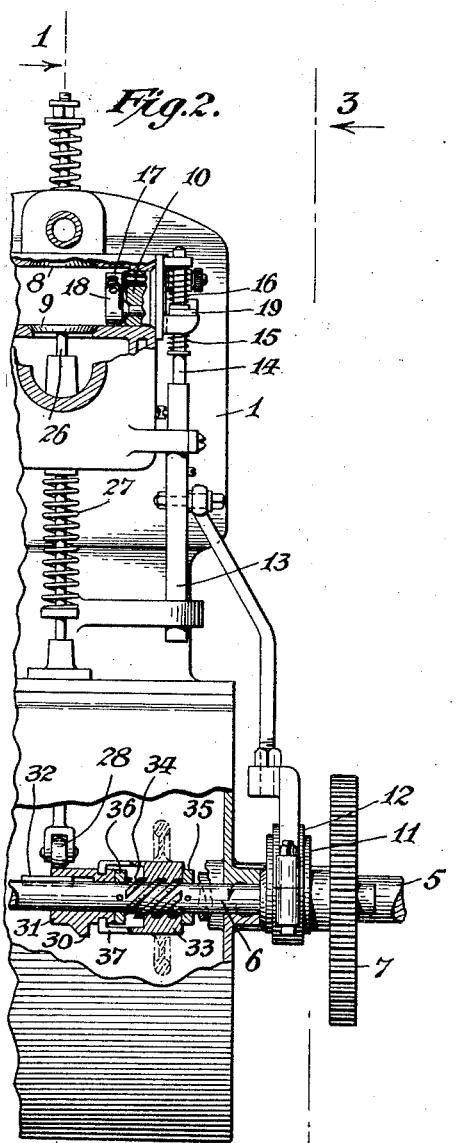
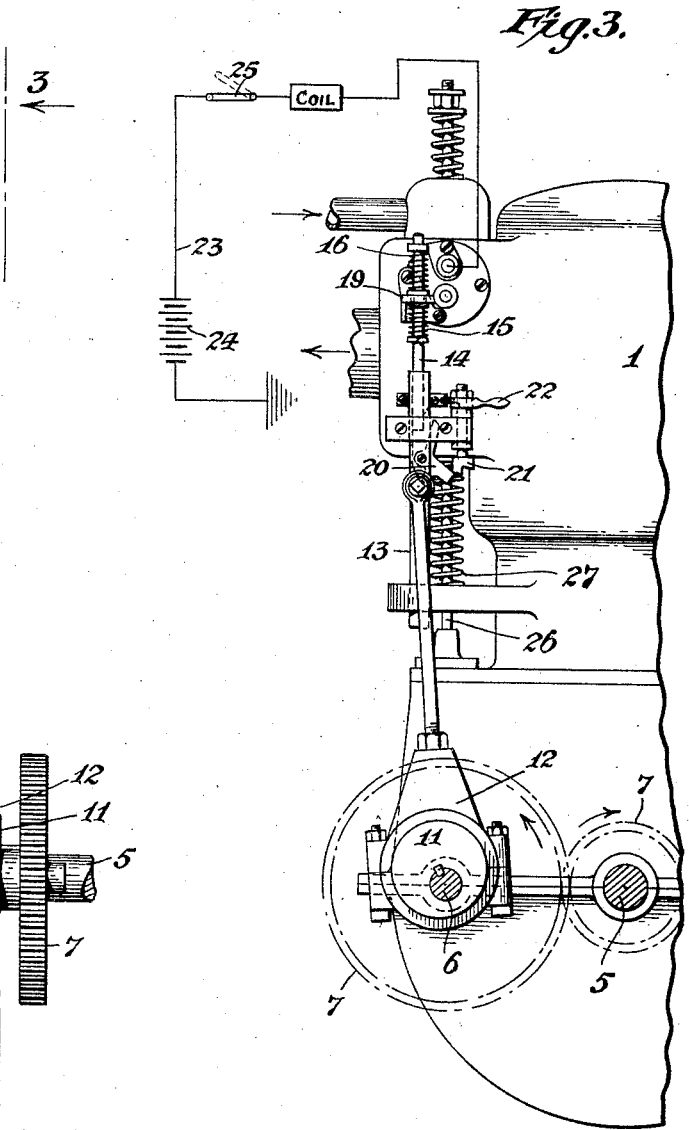
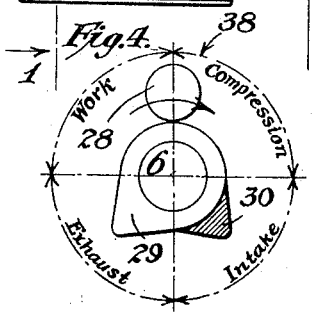
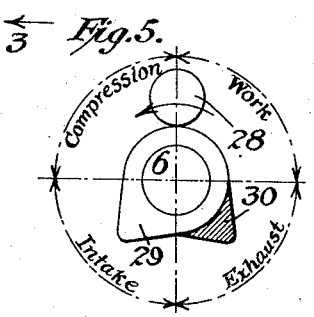
INVENTOR
Leonard H. Dyer

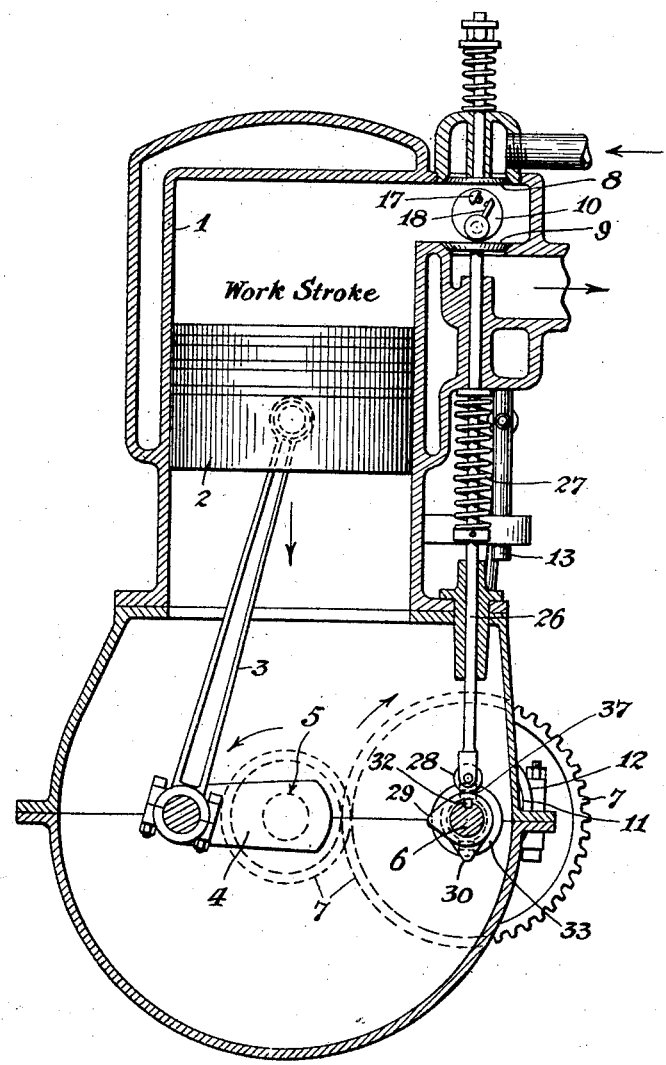

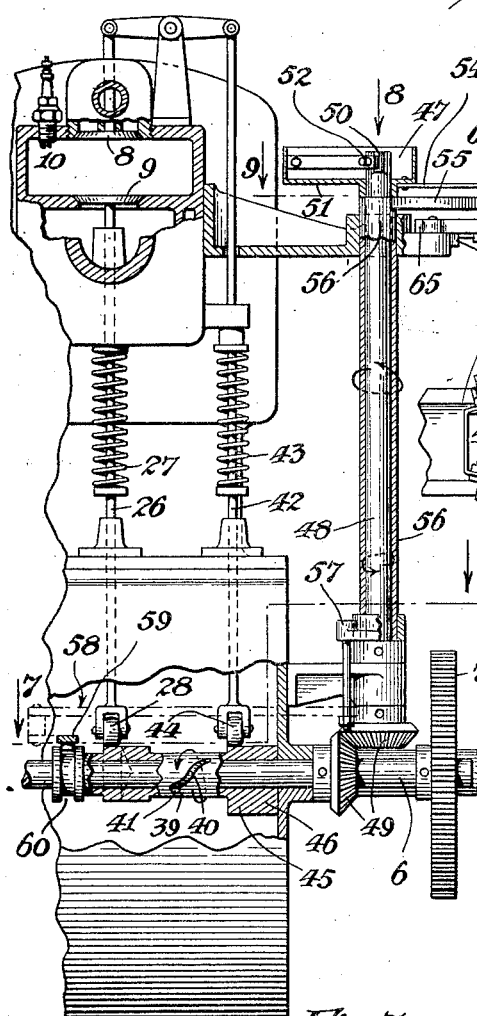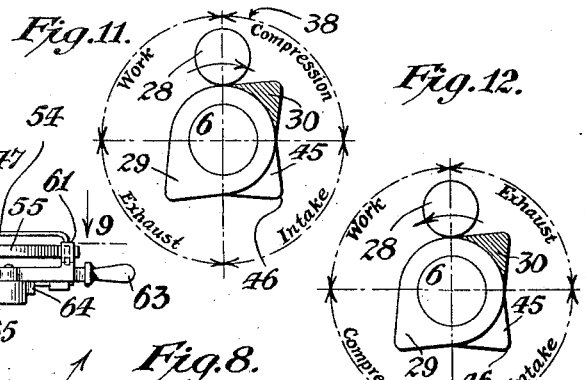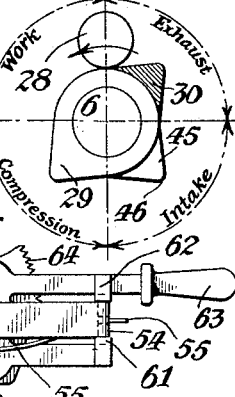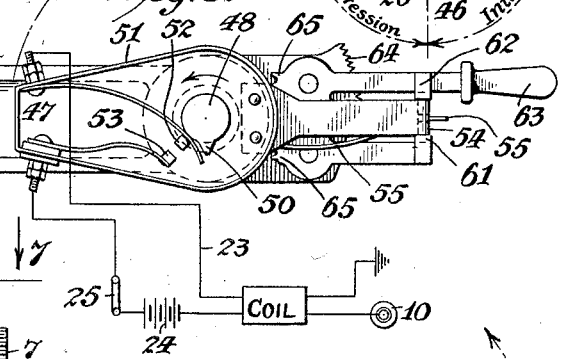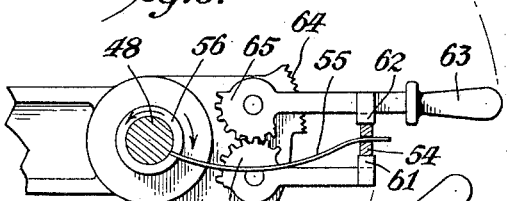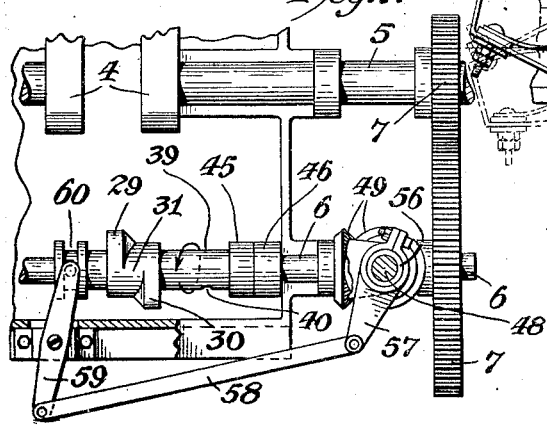

Patented Nov. 3, 1925.

1,560,506

UNITED STATES PATENT OFFICE.

LEONARD H. DYER, OF NEW YORK, N. Y.

INTERNAL-COMBUSTION ENGINE.

Application filed May 29, 1923. Serial No. 642,231.

*To all whom it may concern:*

Be it known that I, LEONARD H. DYER, a citizen of the United States, residing at New York city, in the county of New York and State of New York, have invented a new and useful Internal-Combustion Engine, of which the following is a specification.

My invention relates to internal combustion engines of the four stroke cycle type and the object I have in view is to produce an engine which will be reversible and run equally well in both directions. A further object is to produce an engine of the four stroke cycle type which may be reversed "on the switch."

According to my invention, which I will now describe, I provide means for reversing "on the switch" applied to engines of the four stroke cycle type. Such an engine may be reversed at a distance from the engine where the switch may be located and without the necessity of the operator looking at the engine while it is being reversed. The latter is an advantage in operating in the night time or when on a boat when docking, where all of the operator's attention should be paid to the movement of the boat. The device may be used in other situations, for example in connection with hoisting engines, and tools, where it is desired that the engine can be operated equally well in both directions "on the switch."

The accompanying drawings illustrate several forms of engine embodying my invention.

Figure 1 is a vertical sectional view of a single cylinder, with operating parts, taken on the line 1—1 of Figure 2, looking in the direction of the arrows, said engine having an automatically operated intake valve and a make and break igniter.

Figure 2 is a view at right angles to Figure 1, certain of the parts being broken away from more clear illustration, some other parts being in section.

Figure 3, is a view at right angles to Figure 2, looking at right angles to the arrows.

Figure 4 is a diagrammatic view of the exhaust valve operating cams showing the engine running in the clock-wise direction, with the parts in the position in which they occupy, with the piston at its extreme point of elevation.

Figure 5 is a similar view but with the engine rotating in the anti-clockwise direction.

Figure 6, is a view of a modification, showing a mechanically operated intake valve with a jump spark ignition.

Figure 7, is a sectional view on the lines 7—7 of Figure 6, looking in the direction of the arrows.

Figure 8 is a top view of the interrupter box, on an enlarged scale, showing the parts set for retarded spark.

Figure 9, is a sectional view on the line 9—9 of Figure 6, showing the same parts in the same position.

Figure 10, is a view similar to Figure 8, but with the parts set for advance spark, the valve operating shaft rotating in clockwise direction.

Figure 11, is a diagrammatic view of the valve operating cams, the shaft turning in clock-wise direction with the piston at the extreme upper part of the stroke, and Figure 12, is a similar view, but with the valve operating shaft rotated one quarter revolution in the anti-clockwise direction.

In all of the views, like parts are designated by identical reference characters.

The embodiment which is chosen for illustration, shows a single cylinder 1, which may be the sole cylinder of a single cylinder engine, or one of the cylinders of a multi-cylinder engine. Within this cylinder is the usual piston 2, associated with this is the usual connecting rod 3, crank 4 and shaft 5. The usual valve operating shaft 6, is so arranged as to turn at one half the speed of the crank shaft 5, by means of suitable gears 7. The intake valve 8, is automatic, being opened by the movement of the incoming mixture and closed by its setting spring. The exhaust valve 9, is mechanically operated. The igniter 10, which is chosen for illustration, is of the make and break low tension type and is similar to that shown in Patent #865,099, dated September 3, 1907. This igniter is actuated by an eccentric 11, carried by the valve operating shaft 6. Associated with the eccentric is an eccentric strap 12, actuating a reciprocating rod 13. An igniter rod 14, telescopes within a longitudinal opening in the reciprocating rod. Associated with the igniter is a lower spring 15, and an upper spring 16. The igniter 10, has a fixed electrode 17, suitably insulated, and a movable electrode 18, actuated by the electrode arm 19, outside of the combustion chamber. The igniter rod 14, is lifted by the movement of the reciprocating rod by a trip arm 20, held in engaging position with the lower end of the igniter rod 14, by means of a spring and disengaging by contact with an adjustable stop 21, having a cam surface and operated by an operating lever 22. Associated with the parts of the igniter which are described, is an electric circuit 23, including an impedance coil, a battery 24, and a switch 25. The method of operation of this form of igniter is well known and is as follows: The eccentric 11 and the eccentric strap 12, reciprocate the reciprocating rod 13, raising the igniter rod 14, by engagement with the upper limb of the trip arm 20, against the tension of the lower spring 15. This brings the fixed electrode 17, into contact with the movable electrode 18. When the lower limb of the trip arm 20, comes into engagement with the adjustable stop 21, it is rotated upon its axis, releasing contact with the reciprocating rod 13. Both upper and lower springs 15 and 16, being under tension, rapidly move the electrode arm 19, downward, separating the movable electrode from the fixed electrode, thus producing the ignition spark.

The point of retardation or advance of the spark in relation to the movement of the piston is determined by the position of the adjustable stop 21. It is apparent that as the rotary movement of the valve operating shaft 6, is translated into a reciprocating movement of the igniter 10, with the point of ignition either retarded or advanced the extent of such reciprocating movement is the same, irrespective of the direction of rotation of the engine.

The exhaust valve operating mechanism will now be described. The exhaust valve stem 26, opens the exhaust valve while the exhaust valve spring 27 closes it. On the extremity of the exhaust valve stem, is shown an anti-friction roller 28. This roller is adapted to be brought into contact with the cam mechanism for opening the exhaust valve. In the embodiment which is chosen for illustration there is a clock-wise cam and an anti-clock-wise cam 29 and 30. These terms "clock-wise" and "anti-clock-wise" are employed for convenience of illustration as defining the direction of rotation of both cams. These cams are carried upon a cam nut 31, which is mounted upon the cam shaft 6, and is adapted to be rotated thereby. As illustrated, this cam is capable of longitudinal movement upon the cam shaft. The cams are located in staggered relation to one another so that either cam can operate the exhaust valve, as depends upon its longitudinal position on the shaft, in relation to the valve stem. To cause the cam nut to rotate with the shaft and at the same time to be capable of longitudinal movement thereon, a spline 32, is illustrated. It is apparent that if the cam nut is moved to the limit of its movement in one direction with one cam in actuating position in relation to the exhaust valve stem when the cam nut is moved to the extent of its movement longitudinally upon its supporting shaft in the other direction, the other cam will be in operative position in relation to the exhaust valve stem 26. The cams 29 and 30 are so located upon the cam nut 31 in relation to one another that they will actuate the exhaust valve in proper relation to the movements of the piston of the engine as depends upon the direction of rotation of the engine. One means of automatically doing this is illustrated in the mechanism shown in Figures 1, 2 and 3, but more particularly in Figure 2. The valve operating shaft 6, carrying and rotating the valve actuating cams, is provided with suitable screw threads 34, engaging with similar threads in an actuating nut 33. A suitable stop or collar 35, limits the movement of the actuating nut 33, in one direction while a suitable stop or collar 36, limits the movement of the actuating nut in the opposite direction. The actuating nut has one or more actuating fingers 37, which is engaged with a peripheral groove in the cam nut so that the actuating nut may rotate in relation to the cam nut freely, but when it is moved longitudinally on its supporting shaft it will move the cam nut with it. The actuating nut 33, is designed to have sufficient weight (as for example by having a small fly wheel associated with it, as shown) so that its inertia will be adequate to arrest its rotation in the new direction when the direction of rotation of the cam shaft is suddenly reversed. The effect of this will be that the screw threads 34, will turn within the threads of the actuating nut, moving the latter longitudinally upon the cam shaft 6, to the extent of movement, determined by the stop or collar, 35 and 36.

The operation of so much of my invention as described, is as follows:

Referring to Figure 4, we assume the cam shaft 6, to be turning in the clockwise direction and we further assume that the spark is advanced to the point, say for example, at 38, near the top of the compression stroke. During the next quarter revolution of the shaft 6, the piston will descend, constituting the work stroke of the four cycle.

During the second quarter of the revolution of the cam shaft 6, the clock-wise cam 29, will engage with the anti-friction roller 28, opening the exhaust valve by the cam and allowing it to be closed by its spring, after the peak of the cam passes under the roller. During the next quarter revolution of the cam shaft 6, and during the second downward stroke of the piston, the intake valve 8, will be opened and the explosive mixture introduced into the cylinder. During the last quarter revolution of the cam shaft which is coincident with the upward movement of the piston, the charge will be compressed. Before the piston reaches its uppermost point of travel the igniter will operate. This point is determined by the adjustment of the adjustable stop 21, assuming the engine to be operating at full speed, the point of advance will be considerable. If it is now desired to reverse the engine the switch 25, is opened. While the igniter will operate as before, there will of course be no spark due to the interrupted circuit. The engine is now rotated solely by the momentum of its fly wheel and its speed will diminish. Before it has stopped, the switch 25, being closed by the operator will cause the igniter to function as before, producing the spark in the same place in relation to the movement of the piston. The engine rotating much slower than before, ignition will occur before the piston reaches the dead center and the piston will be driven downward turning the crank shaft in the opposite direction. The effect of this will be for the actuating nut 33, due to its momentum through rotation in one direction, and also due to its inertia, will rotate in relation to the cam shaft 6, turning upon the screw threads 34, and moving the actuating nut 33, longitudinally upon its shaft by means of the actuating finger 37. The cam nut 31, will be similarly moved longitudinally upon the shaft and the anti-clock-wise cam 30, will be shifted in a path to engage with the anti-friction roller. The cam shaft will then be rotating in the direction shown in Figure 5, the anti-clock-wise cam, 30 actuating the exhaust valve through the second quarter of the rotation of the cam shaft. The other steps in the cycle will occur in the same order as described, when the cam shaft was turning in the clock-wise direction. In order to prevent injury to the valve stem and anti-friction roller 28, by engaging with the sides of either cams 29 or 30 the contiguous side of these cams can be beveled as shown. The pitch of the screw threads 34, should be such that the valve nut will be shifted to change one cam from engagement with the anti-friction roller to the other cam in not more than one quarter of a revolution of the cam shaft, so that the proper cam will function to open the exhaust valve in the next following exhaust stroke of the piston so that the engine will freely work in the new direction. The operator has within his power the means of constantly changing the direction of rotation of the engine simply by opening and closing the switch and by this means reverse gears and clutches are not necessary or required. The engine may be reversed as many times as desired by this action without the need of manually moving or resetting any part of the mechanism.

The embodiment of my invention illustrated from Figures 6 to 12 inclusive, provides for a mechanically operated intake valve, and also in the same embodiment is illustrated a jump spark high tension form of ignition. Also in this embodiment is shown a modification of means of automatically shifting the clock-wise cams and anti-clock-wise cams to operative position in relation to the anti-friction roller. Referring to Figures 6 and 7, the cam nut 31, turning upon the cam shaft 6, is connected to a sleeve 39. This sleeve has in it an inclined slot 40. This slot is engaged by a pin 41, carried by the cam shaft. The sleeve and cam nut are free to rotate in relation to the cam shaft and are also free to partake of longitudinal movement except as limited by the pin and slot. This pin and slot form a variety of screw by means of which the sleeve 39 and the cam nut 31, are moved longitudinally upon the shaft.

The intake valve 9, has an intake valve stem 42, by means of which the valve is opened, and an intake valve spring 43, by means of which it is closed. The end of the stem is shown as provided with an anti-friction roller. On the shaft 6, is a clock-wise cam 45, for intake, and an anti-clock-wise cam 46, for intake, turning freely upon the cam shaft. The parts are designed with sufficient weight so that with their momentum due to rotation in one direction, together with their inertia, will cause them to rotate in relation to the shaft when the direction of movement of the latter is suddenly changed. The engagement of the pin 41, with the slot 40, the latter being inclined as shown, will move these devices longitudinally upon the shaft so that one set of cams will be moved from operative position to inoperative position and the other set from inoperative position to operative position. It is to be noted that in addition to the cam nut and cams being moved longitudinally upon the shaft, they are also partly rotated and this has to be taken into consideration in the location of the cams in relation to the cam nuts and in connection with the sleeve. Figure 11 shows the position of the cams when the shaft 6, is turning in clock-wise direction, while the piston is at the top of the stroke just at the end of the compression stroke. Assuming that the point of ignition has been at the point of advanced ignition and the engine turning so slow that the piston would not pass the dead center, it is driven downward in the opposite direction, by the switch being closed by the operator.

Figure 12 shows the cam shaft having made a quarter revolution. During this quarter revolution the cam nut and the sleeve with the intake operating cams have been slid along the shaft. There has been a quarter revolution of relative rotation between these parts and the shaft. Therefore the anti-clockwise cam 30, will be in position to engage with the anti-friction roller 28, to open the exhaust valve in the anti-clockwise direction of rotation. Therefore with this arrangement the two exhaust operating cams 29 and 30 should be about 180 degrees apart and the cam slot 40, should not exceed 90 degrees of extent with the intake operating cams 45 and 46 so placed in relation to their corresponding exhaust operating cams 29 and 30, as to be about 90 degrees behind the latter. As the shaft 6, will make a one quarter revolution in a new direction before it begins to rotate the cam nut in this embodiment of the invention, the clockwise cam for intake valve and the anti-clockwise cam for intake valve will be coincident to one another, each being about 90 degrees behind its corresponding exhaust valve operating cam.

The jump spark ignition mechanism whereby the adjustment of spark advance will be automatically taken care of, when the engine is reversed, as will now be described.

In the embodiment which is chosen for illustration there is the usual form of interrupter or timer 47, the parts of which are actuated by a shaft 48, turned in time with the cam shaft 6, by means of actuating gearing 49. This shaft 48, carries an interrupter cam 50, located within the interrupter box 51. The box carries a movable contact 52 and a fixed contact 53, adapted to be brought into engagement with it by the engagement of the interrupter cam 50, with the movable contact. The box is adapted to be partly rotated in relation to the engine so that the spark may be advanced or retarded as is well understood, by means of the following automatic mechanism:—Figure 8, shows the box in position for retarded spark; Figure 10 shows the box in position for advance spark. The interrupter cam rotates in anti-clockwise direction when the engine is reversed. In order to advance the spark in the new direction, the interrupter box 51, must be partly rotated in the other direction, as shown in dotted lines in Figure 10. In order to accomplish this automatically the following mechanism is employed. The interrupter box 51, is provided with an actuating arm 54. In contact with this arm is a setting spring 55. This setting spring is carried by a sleeve 56. The sleeve has an arm 57, connected by means of a link 58, to a lever 59, having a forked end engaging in a groove 60, associated with the cam nut 31. The longitudinal movement of the cam nut sliding on its shaft by means of the mechanism first described, will rotate the sleeve 56, and with it the setting spring 55. There is provided an advanced stop 61, for clock-wise movement and an advanced stop 62 for anti-clockwise movement. These determine the limits to which the setting spring through the engagement of the arm 54, will rotate the interrupter box to secure desired advance of spark. In order that these two stops be moved at equal distance from the medial line, they are carried upon arms having intermeshing gears 65. A suitable handle 63, actuates one of the stops and by means of the gears 65, the other stop is similarly actuated, in the other direction. A suitable rack 64, holds the arm in set position. This embodiment of my invention operates as follows:

When the engine is running in the direction to turn the cam shaft in the clockwise direction, the parts are in position shown in Figures 6 to 10 inclusive. The clockwise cam 29 for exhaust and clockwise cam 45 for intake, are in position to actuate the respective exhaust valve and intake valve stems. The valve sleeve 39, being at the extreme right, rotates the sleeve 56 and moves the setting spring 55, to engage the actuating arm 54, with the advance clockwise stop 61, moving the interrupter box 51, so that the spark is produced in advanced position. If now the switch 25, is opened and not closed until the engine has so decreased in speed that when it is again closed the spark will occur and ignite the charge before the piston reaches the end of its stroke, the engine will turn in the opposite direction. The result of this will be to shift the cam shaft to the left in Figures 6 and 7 bringing the anti-clockwise cam 30 and anti-clockwise cam for intake 46 into operative position. At the same time the sleeve 56, will be given a partial rotation in the opposite direction. This by means of the setting spring 56, will move the actuating arm 54, into contact with the advanced stop movement 62 and will move the interrupter box 51, to the dotted line position shown in Figure 10. This will secure a corresponding advanced spark when the shaft 48 is turning in the opposite direction. It is therefore unnecessary, with this embodiment of the invention using a jump spark ignition, to manually adjust the lead of the spark to the advanced position after the engine has been reversed, as this is attained automatically, as has been described.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention, what I claim as new and desire to secure by Letters Patent, is:

1. An engine of the four stroke cycle type, having an exhaust valve, a rotating valve operating shaft, for opening said valve, means for reversing the direction of rotation of the engine and shaft, and means operatable by the direction of rotation of the valve operating shaft for timing the period of valve opening in relation to the point of ignition, said means actuating the exhaust valve on the first exhaust stroke following the change of direction of rotation of the engine.

2. An engine of the four stroke cycle type, having igniting means including an electric circuit, a switch in said circuit, an exhaust valve, a rotating valve operating shaft, for opening said valve, means for reversing the direction of rotation of the engine and shaft, and means operatable by the direction of rotation of the valve operating shaft for timing the period of valve opening in relation to the point of ignition, said means actuating the exhaust valve on the first exhaust stroke following the change of direction of rotation of the engine.

3. An engine of the four stroke cycle type, having an exhaust valve, rotating valve operating shaft, for opening said valve, means for reversing the direction of rotation of the engine and shaft, an inlet valve, said shaft also acting to open said inlet valve, and means operatable by the direction of rotation of the shaft for timing the period of opening of both valves in relation to the point of ignition, said means actuating the exhaust valve on the first exhaust stroke following the change of direction of rotation of the engine.

4. An engine of the four stroke cycle type, having an exhaust valve, a rotating valve operating shaft, means for reversing the direction of rotation of the engine and shaft, valve actuating means turned by such shaft, said means having devices for actuating the valve for rotation in both directions, such means being controlled by momentum, when the direction of rotation of the shaft is reversed, such means actuating the exhaust valve on the first exhaust stroke following the change of direction of rotation of the engine.

5. An engine of the four stroke cycle type, having a valve, a rotating cam shaft, means for reversing the direction of rotation of the engine and shaft, cams actuated by said shaft, said cams being capable of longitudinal movement in relation to the valve, and means actuated by momentum when the direction of the shaft is reversed to longitudinally move said cams in relation to the valve.

6. An engine of the four stroke cycle type, having an igniting system, which includes means for operating the same and a switch for interrupting the circuit, an exhaust valve, a rotating valve operating shaft, for actuating the exhaust valve, means for reversing the direction of rotation of the engine and shaft, said shaft having devices actuated by the movement of the said shaft when the direction of movement of the engine is reversed, to function in time, after the operation of the igniter, said means operating to open the exhaust valve on the first exhaust stroke of the engine after its direction of rotation is changed, whereby the engine may be reversed on the switch, by opening the circuit and closing it on a compression stroke before the dead center is reached, thus exploding the charge and moving the piston on a work stroke before the dead center is reached and opening the exhaust valve on the next stroke, to expel the products of combustion from the cylinder.

7. An engine of the four stroke cycle type, having an exhaust valve, means for reversing the engine, two cams for actuating the said exhaust valve, one for each direction of rotation, and means actuated by the change of direction of rotation of the engine for changing the position of the cams, so they will be changed on the next expulsion stroke of the engine after reversal.

8. An engine of the four stroke cycle type having an exhaust valve, means for reversing the direction of rotation of the engine and shaft, a cam shaft moving in time with the engine, two cams for actuating the exhaust valve, said cams being turned by the cam shaft, and a screw associated with the cam shaft and the cams, for moving the cams longitudinally on the cam shaft by means of a change of direction of rotation of the engine.

9. A reversible engine of the four stroke cycle type, having an igniter, means for rendering the igniter temporarily inoperative for reversing the engine, an exhaust valve, means operatable by a moving part of the engine for operating said exhaust valve, said means being operatable by the direction of rotation of the engine for timing the period of valve opening in relation to the point of ignition, said means actuating the exhaust valve on the first exhaust stroke next following the change of direction of rotation of the engine, said means being actuated solely by the rotation of the engine, whereby the engine may be reversed a plurality of times without need of extraneous means.

10. A reversible engine of the four stroke cycle type, having igniting means including an electric circuit, a switch in said circuit, an exhaust valve, means operatable by a moving part of the engine for operating said valve, and means operatable by the direction of rotation of the engine for timing the period of valve opening in relation to the point of ignition, said means actuating the exhaust valve on the first exhaust stroke following the change of direction of rotation of the engine, said means being operatable solely by the rotation of the engine whereby the engine may be reversed a plurality of times solely by means of the switch without extraneous means.

This specification signed this 28th day of May, 1923.

LEONARD H. DYER.